R. K. McLEAN & W. K. GIBSON.
SAFETY REFLECTOR FOR VEHICLES.
APPLICATION FILED MAY 22, 1908.

899,698.

Patented Sept. 29, 1908.

2 SHEETS—SHEET 1.

R. K. McLEAN & W. K. GIBSON.
SAFETY REFLECTOR FOR VEHICLES.
APPLICATION FILED MAY 22, 1908.

899,698.

Patented Sept. 29, 1908.
2 SHEETS—SHEET 2.

UNITED STATES PATENT OFFICE.

ROBERT KNOX McLEAN AND WILLIAM KENNEDY GIBSON, OF BELFAST, IRELAND.

SAFETY-REFLECTOR FOR VEHICLES.

No. 899,698.  Specification of Letters Patent.  Patented Sept. 29, 1908.

Application filed May 22, 1908. Serial No. 434,394.

*To all whom it may concern:*

Be it known that we, ROBERT KNOX MCLEAN and WILLIAM KENNEDY GIBSON, residing at Chichester Buildings, 16 Chichester street, Belfast, Ireland, have invented certain new and useful Improvements in and Relating to Safety-Reflectors for Tram-Cars, Motor-Omnibuses, and like Vehicles; and we do hereby declare the following to be a full, clear, and exact description of the invention, such as will enable others skilled in the art to which it appertains to make and use the same.

This invention relates to improvements in appliances designed for application to tram-cars, motor omnibuses, and vehicles mainly employed in busy and crowded thoroughfares, the object being to provide for the safety of persons or passengers when alighting from the vehicle.

Where vehicles are running in close order and in the same direction, and line, frequent accidents arise through the passenger or person alighting failing to observe the close proximity of the next and following horse, horses, or vehicles. As a means of affording warning of the near approach of succeeding vehicles, we employ a reflector (preferably a panel) of glass or highly polished metal placed at the rear end of the vehicle, and in such position and at such an angle in relation to the end of the car and the hand rail and foot board or steps as to reflect and show near following traffic; the reflector and reflections thereon being seen by the passenger without conscious effort when glancing at or looking for the hand rail or other like grip.

Figure 1:
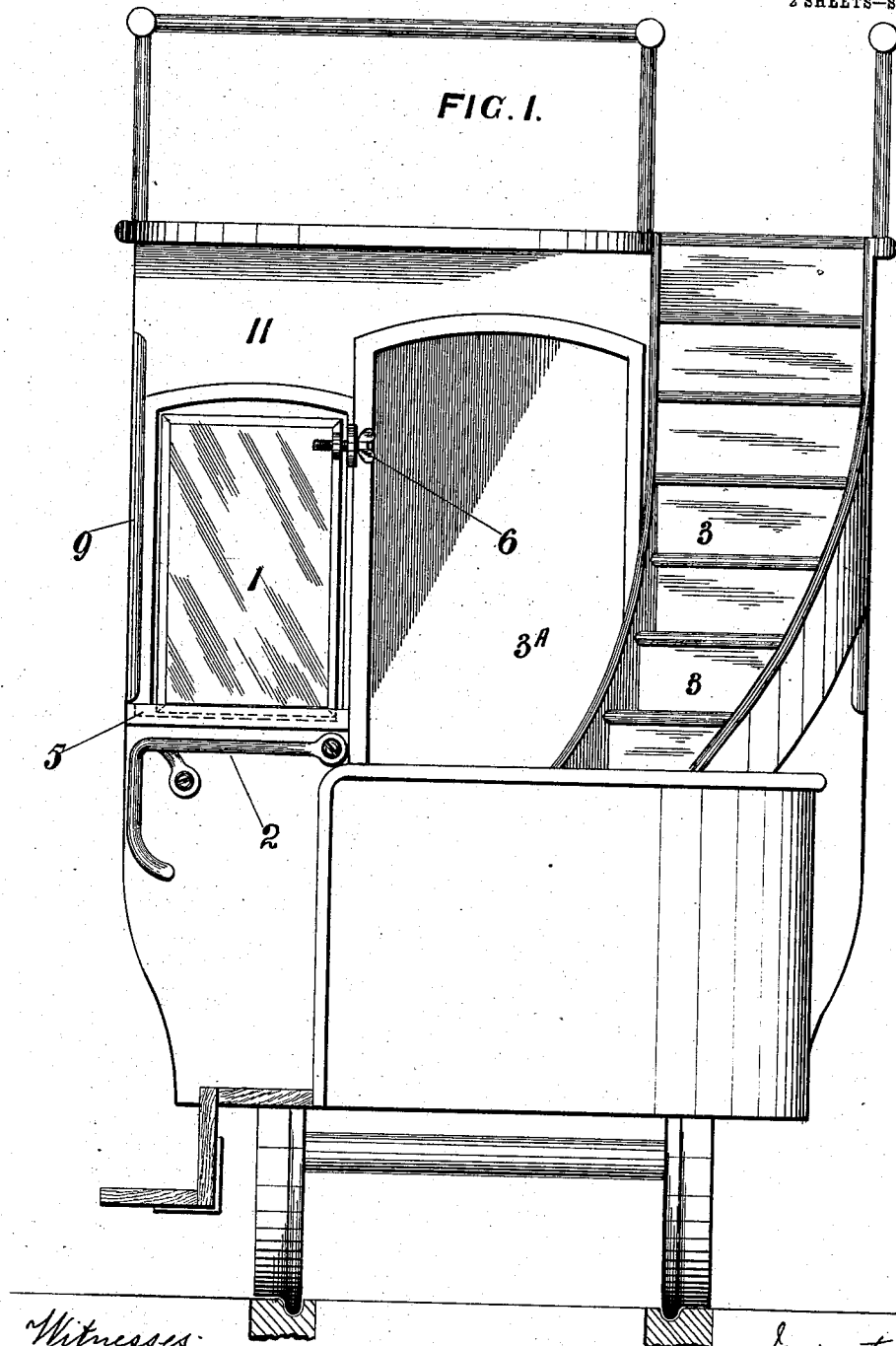
Figure 2:
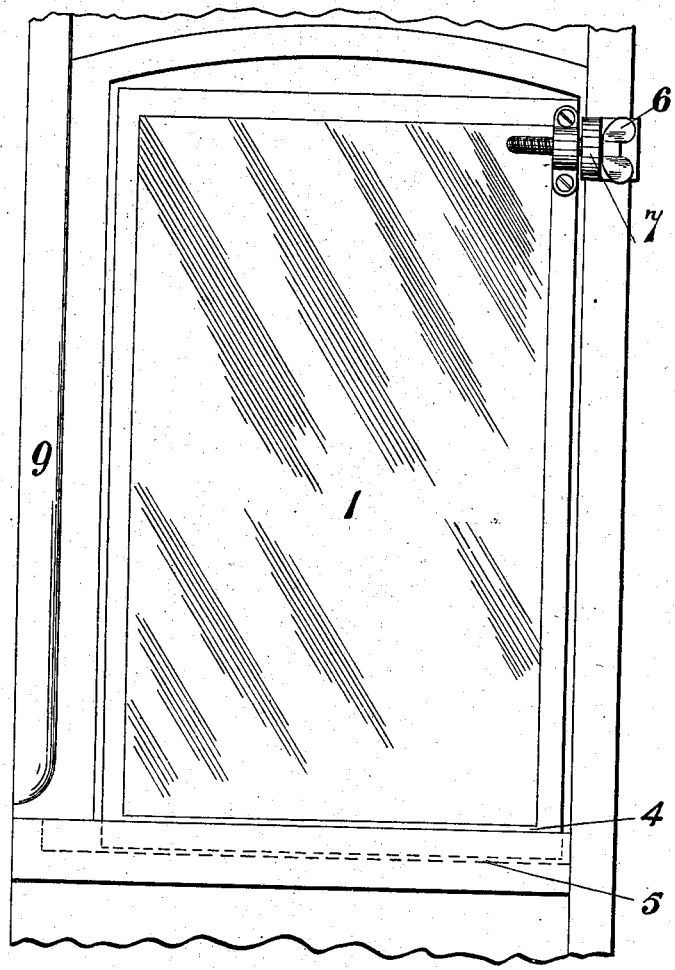
Figure 3:
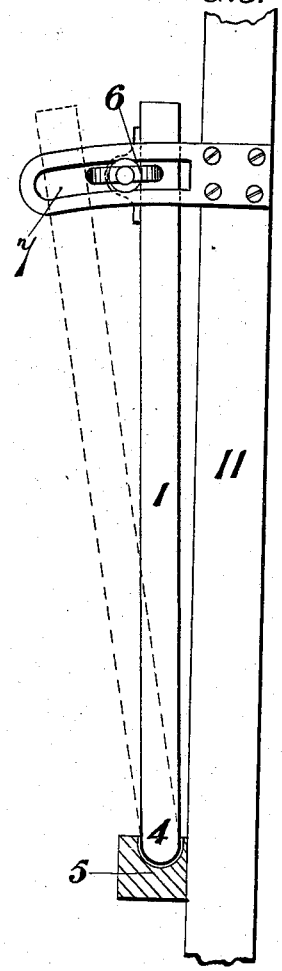
Figure 4:
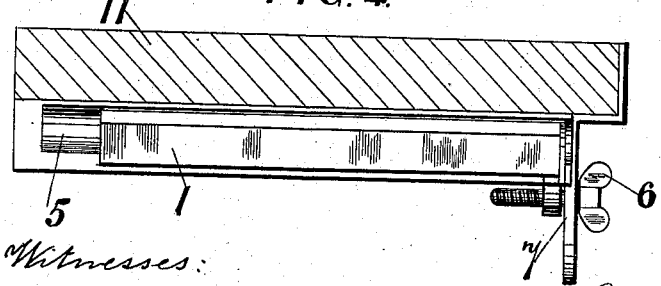

Referring to the drawings which form a part of this specification:—Figure 1 is an end elevation of a tramcar bus or like vehicle having the improved safety device applied thereto. Fig. 2 is a detail of glass or reflector and its attachments. Fig. 3 is an end view of Fig. 2. Fig. 4 is a sectional plan view of a portion of Fig. 2.

According to this invention at 1 is a looking glass mirror or reflector placed near the hand rail 2 so that the passenger about to leave the vehicle by the steps 3 or door 3ᴀ, in looking for the hand rail, will without conscious effort see the rail 2 and the glass or mirror 1, and in the latter the reflection of the nearest following vehicle thus affording ample warning of the latter's approach. The frame of the glass or mirror 1 is preferably rounded as at 4 and rests in a concave bearing bar 5 so as to readily admit of its angle being adjusted, as shown by dotted lines in Fig. 3, by use of screw and winged nut 6 and slot 7, and in order to provide for the ready removal of the glass or mirror while the vehicle is being washed down and its easy replacement. If in any instance it is found desirable that the glass should be capable of lateral movement, in addition to its angular adjustment, then the screwed spindle of the winged nut 6 will be made longer so as to admit of the glass being moved along in the trough 5 to the desired position, nearer to or further from the outside edge 9 of the body 11 of the vehicle. A like glass or reflector is fixed at each end of the car so as to provide for the reverse running of the car.

Having now described our invention, what we claim as new and desire to secure by Letters Patent is:—

The combination, with a vehicle-body, of a bearing-bar secured to the said body and provided with a trough in its upper side, a reflector slidable longitudinally in the said trough and provided with a frame having a rounded lower edge which rests in the said trough, and adjustable fastening-devices connecting the upper part of the said reflector with the said body and permitting the said reflector to be adjusted.

In testimony whereof we affix our signatures, in presence of two witnesses.

ROBERT KNOX McLEAN.
WILLIAM KENNEDY GIBSON.

Witnesses:
KERR McCLURE,
MARTHA CROTHERS.